US005648763A

United States Patent [19]

Long

[11] Patent Number: 5,648,763
[45] Date of Patent: Jul. 15, 1997

[54] METHOD AND APPARATUS FOR GLOBAL POSITION RESPONSIVE SECURITY SYSTEM

[75] Inventor: George E. Long, Monroe, Wash.

[73] Assignee: Trimble Navigation, Ltd., Sunnyvale, Calif.

[21] Appl. No.: 956,372

[22] Filed: Oct. 5, 1992

[51] Int. Cl.[6] .................... H04Q 1/00

[52] U.S. Cl. .................... 340/825.49; 340/825.31

[58] Field of Search .................... 340/825.49, 825.31, 340/825.35, 825.75; 379/44, 59, 58

[56] References Cited

U.S. PATENT DOCUMENTS

| | | | |
|---|---|---|---|
| 4,651,157 | 3/1987 | Gray et al. | 342/457 |
| 4,750,197 | 6/1988 | Denekamp et al. | 340/825.35 |
| 4,837,700 | 6/1989 | Ando et al. | 364/449 |
| 4,868,915 | 9/1989 | Anderson, III et al. | 340/825.31 |
| 4,899,285 | 2/1990 | Nakayama et al. | 364/453 |
| 4,924,402 | 5/1990 | Ando et al. | 364/449 |
| 4,949,268 | 8/1990 | Nishikawa et al. | 364/449 |
| 4,970,652 | 11/1990 | Nagashima | 364/449 |
| 4,983,980 | 1/1991 | Ando | 342/357 |
| 4,996,525 | 2/1991 | Becker et al. | 340/825.31 |
| 5,014,206 | 5/1991 | Scribner et al. | 364/449 |
| 5,040,240 | 8/1991 | Keegan | 455/260 |
| 5,204,819 | 4/1993 | Ryan | 340/825.35 |
| 5,230,081 | 7/1993 | Yamada et al. | 379/59 |

*Primary Examiner*—Michael Horabik
*Attorney, Agent, or Firm*—Dowrey & Associates

[57] ABSTRACT

A method and apparatus for use in a security system for controlling access to mobile enclosures and cargo containers. Navigtational tracking systems such as LORAN and Global Positioning Systems are used to produce a real time geographic position signal. A programmable data processor is used to compare a preset geographic position signal to the real time geographic position signal. Upon favorable comparison of the real time and preset signals, an enabling signal is produced which permits operation of the security system to gain access to the container.

16 Claims, 2 Drawing Sheets

FIG. 3
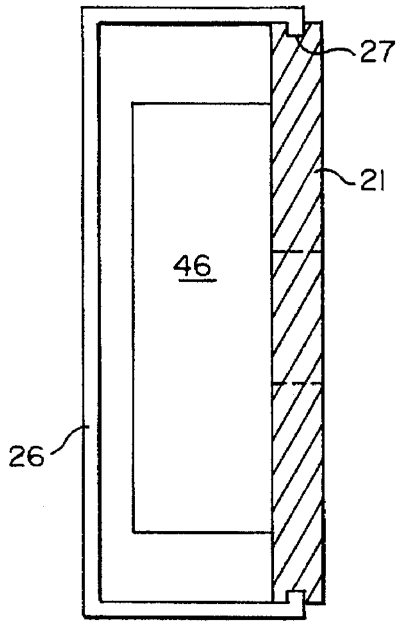
FIG. 4
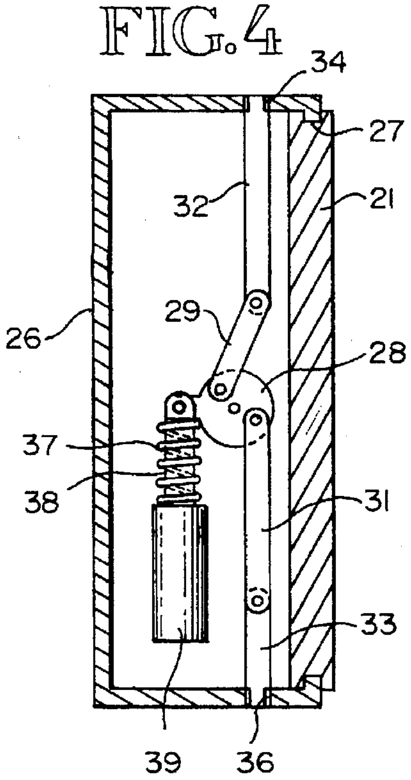
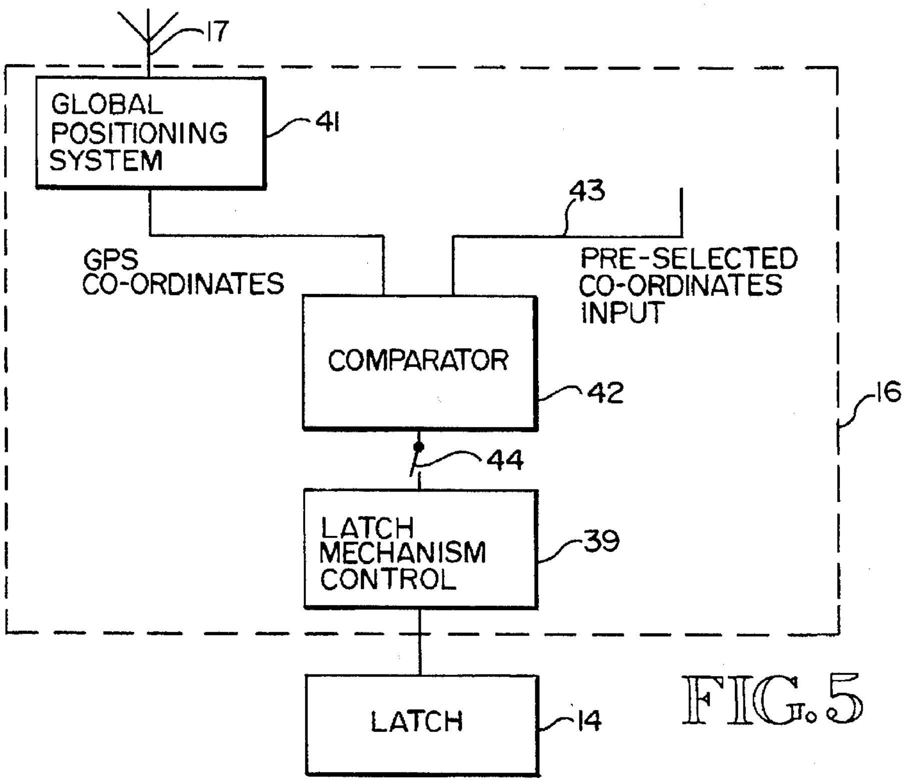
FIG. 5

METHOD AND APPARATUS FOR GLOBAL POSITION RESPONSIVE SECURITY SYSTEM

BACKGROUND OF THE INVENTION

1. Field of the Invention

The present invention relates to a security system for mobile containers or the like which prevents the unlocking or opening of such containers or the manipulation of a security system until the intended destination is reached. According to the present method, geographic positional information from existing external transmitters is compared to preset geographic positional information to control or enable a latching or locking mechanism associated with the mobile container or associated enclosure.

In its broadest sense, the present inventive concept relates to the combination of global position navigational or tracking systems, an enabling signal responsive security mechanism for a mobile unit and programmable comparator means to compare received geographic position information with preset or preprogrammed geographic positional information. The security system is not enabled or accessed until the received positional information, indicating the exact geographic location of the mobile unit, matches the preset positional information so as to produce an enabling signal for the security mechanism in a predetermined manner.

2. Description of the Prior Art

In the past various conventional locking mechanisms such as padlocks, combination locks or seals have been used to secure shipping containers which are transported either by truck, rail, air or marine vessel. Many types of electronic locking and security devices have also been available wherein an operator must utilize coded information such as security cards, punch-in combinations or the like in order to gain access to vehicles and shipping and cargo containers. Examples of such electronic coded locking systems are found in U.S. Pat. No. 4,868,915 to Anderson III et al and U.S. Pat. No. 4,996,525 to Becker, Jr. et al. In spite of these efforts, however, the problem of unauthorized entry and/or unloading of materials or merchandise remains a major problem in the shipping and cargo transportation industry. From a broader prospective it is oftentimes desirable, for security or other reasons, to have a particular function performed only at a predetermined geographical location. Such functions may entail such items as fueling, information access or mere surveillance ability.

Although various devices have been proposed in the shipping and transportation industry which utilize navigational tracking systems, such devices primarily provide information for tracking vehicle location only. The following U.S. patents disclose various examples of vehicle tracking systems of the type referred to:

| | |
|---|---|
| 4,651,157 | Gray et al |
| 4,837,700 | Ando et al |
| 4,899,285 | Nakayama |
| 4,924,402 | Ando et al |
| 4,949,268 | Nishikawa |
| 4,983,980 | Ando |
| 4,970,652 | Nagashima |

These devices utilize several types of existing navigational systems such as LORAN and Global Positioning Systems (GPS), disclosed in detail in the U.S. Pat. No. 5,040,240 to Keegan. The object in these prior systems is usually to provide a trip record or history indicating the exact location in terms of geographic coordinates (longitude and latitude) of the vehicle, either during its travel or at the locations of specific operations such as loading or unloading. U.S. Pat. No. 5,014,206 to Scribner et al discloses one such application of a navigational system to a delivery truck.

To the best of applicant's knowledge, however, navigational tracking equipment has not been combined with security systems such as locking or access mechanisms for mobile cargo containers and the like. Although the tracking of the vehicle, aircraft or vessel is valuable information for the control of vehicle and vessel movement and to create trip records, these systems leave untouched the acute problems of unauthorized entry and disappearance of valuable merchandise somewhere between the departure point and the intended destination of the mobile container.

SUMMARY OF THE INVENTION

The present invention for the first time provides a method and apparatus for use in security systems, such as those controlling access to mobile enclosures, shipping containers and the like, utilizing geographic positional information. Navigational systems such as the well known LORAN and GPS navigational system are mounted on the container itself or may be mounted in association with the container such as on the vehicle or vessel used to transport the container. These two well known systems in particular have been widely used in the prior art for tracking and determining the exact location of a vehicle, vessel or individual at any given time. These two systems rely on externally transmitted radio frequency signals to calculate the location of a receiving antenna mounted on the moving object. As is well known, the LORAN system calculates the geographic positional information or coordinates in terms of latitude and longitude based on the time difference in signals received from multiple transmitters utilizing the known location of the transmitters and the time lag between the reception of the plurality of signals for its calculation. The GPS navigation system, known to be more accurate than the LORAN system, utilizes transmitters positioned on orbiting satellites. The time and location information of the satellites plus the doppler shift of the radio frequency signal from the satellite is used to calculate the location of the receiver. The present invention utilizes the geographic positional information, in the form of a signal or signals from the navigational system, in combination with preprogrammed or preset positional informational signals to control or enable a security system such as a locking or latching mechanism to prevent unauthorized access to containers or the like. The received positional information is compared to the preset positional information and, when these signals match in a predetermined manner, an enabling signal is sent to the security system. With the present method a security system is provided which protects a mobile unit during its travel between a departure point and one or more preset destinations.

BRIEF DESCRIPTION OF THE DRAWINGS

FIG. 3 is a cross-sectional view taken along lines 3—3 of FIG. 2;

FIG. 4 is a cross-sectional view taken along lines 4—4 of FIG. 2; and

FIG. 5 is a flow chart illustrating the general steps used to carry out the method of this invention.

DESCRIPTION OF THE PREFERRED EMBODIMENT

Figure 1:
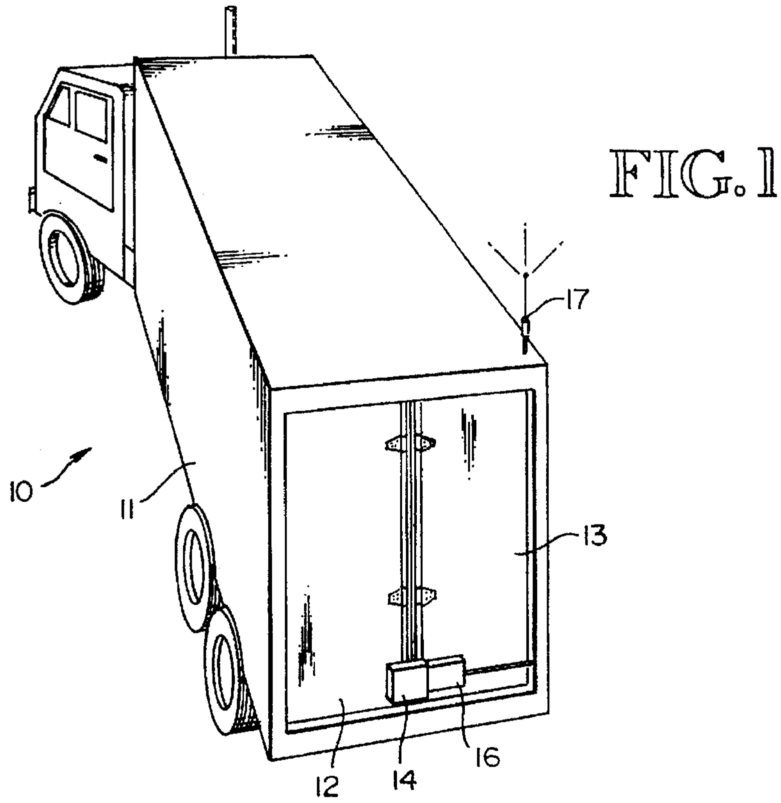
FIG. 1 illustrates a typical mobile unit equipped with the security system of the present invention.

By way of example, the invention will be described as embodied in a security or locking system for a mobile cargo container which, it will be understood, could be transported by any means such as rail, truck, aircraft, or marine vessel. It will also be understood that the invention is applicable to bulk carriers such as cement mixers and the like wherein unloading is required at one or more preset destinations. As shown in FIG. 1, a road truck 10 is provided with cargo unit 11 of well known conventional design and may either be a removable unit or part of the vehicle itself. In any event, the container 11 comprises an enclosure having an access opening with doors 12 and 13 which are locked in the closed position by, in this instance, a mechanical locking apparatus illustrated schematically at 14. The security system includes a security unit 16 which houses the GPS system, a programmable comparator device and a latching mechanism which is responsive for its operation to signals from the comparator. Although the present system utilizes a GPS system, it will be understood that other navigational systems such as the LORAN system may be utilized in the present invention to provide the geographic positional information as one input to the comparator, presently to be described. It will also be noted that, although FIG. 1 depicts an antenna 17 connected to the GPS or LORAN unit, commercially available GPS systems, such as that manufactured by Trimble Navigation, Ltd., 645 North Mary Avenue, Sunnyvale, Calif. 94088, may incorporate the antenna within the housing of the navigation unit itself.

Figure 2:
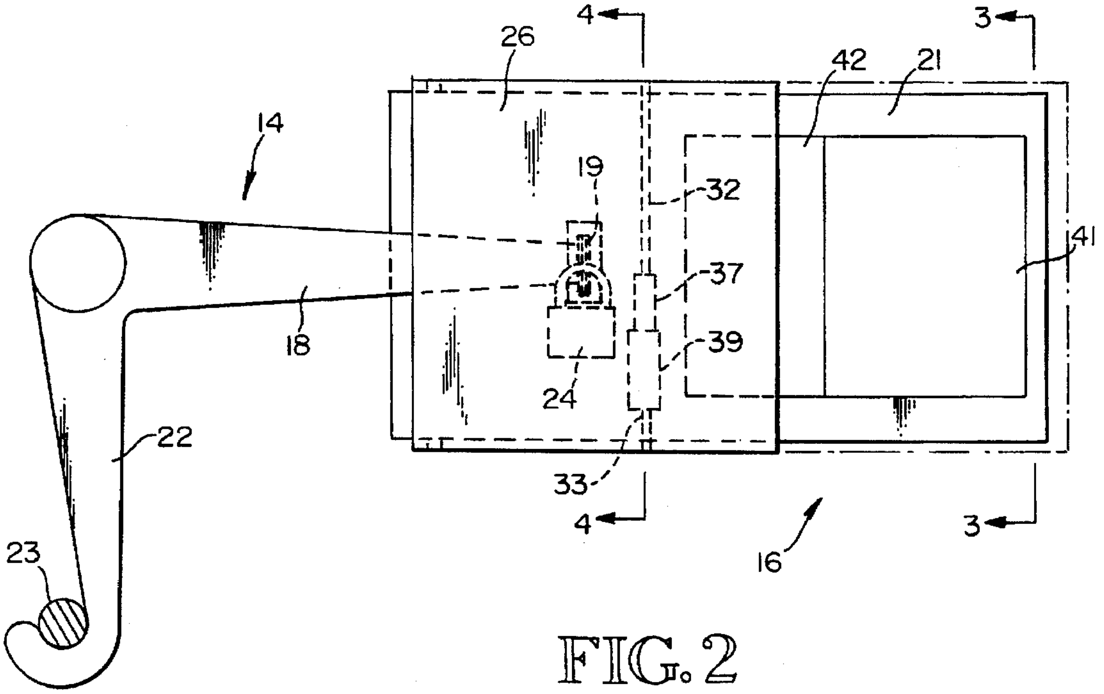
FIG. 2 is a schematic illustration of one form of mobile container locking mechanism combined with the navigational system, signal comparing means and latch mechanism control means.

FIG. 2 is a schematic illustration of the container latching mechanism utilized in conjunction with the GPS receiver, signal comparator and a latch mechanism control apparatus. It will be understood that any form of container door locking mechanism or hardware is adaptable to the present invention and that the locking mechanism 14 in FIG. 2 is intended to be only a schematic representative of one type of locking mechanism for purposes of illustration. The lock device 14 is seen to be in the form of a crank arm mounted in some pivotal fashion on the container door with the distal end of one arm 18 engagable with a keeper 19. The other arm 22 will engage a rod or bar 23 on the other door with the mechanical linkage of the door lock mechanism usually connecting one or both of the door members to the upper and lower sills of the container body (not shown). In this manner the door members are locked together and to the container body with a padlock or the like 24 securing the end of the arm 18 to the keeper 19.

In the present embodiment of the security system, a slidable cover plate 26 is mounted on the base plate 21 by such means as the tongue and groove engagement 27 shown in FIGS. 3 and 4. The cover plate 26 is slidable on the base plate 21 between a locked position as shown in FIG. 2, wherein the padlock 24 is completely covered, and the unlocked position shown in dotted lines. The cover plate 26 will of course be a heavy structural member designed to prevent operation of the door lock 14 while it is in its locked position. When moved to the unlocked dotted line position shown, in the right hand direction in FIG. 2, the padlock 24 is uncovered and the cargo may be accessed. The cover plate 26 is secured in its locked position shown in FIG. 2 by means of a solenoid controlled latching device mounted on the base plate 21. In the present embodiment, the rotary latch bolt actuator 28, mounted on the base plate 21, is pivotally connected to the links 29 and 31 as seen most clearly in FIG. 4. The links 29 and 31 in turn are pivotally connected to the latch bolts 32 and 33 respectively. The latch bolts 32 and 33 are slidably mounted in fixed position on the base plate 21 and engage openings 34 and 36 in the cover plate 26 to hold the slidable cover plate in the locked position.

The rotary latch bolt operator 28 is held in the latched position shown in FIG. 4 by means of the compression spring 37 which surrounds the arm 38 connected to the armature of the solenoid 39. The arm 38 is pivotally connected to rotate the operator 28. The spring 37 may be seated against the rotary member 28 and the solenoid 39 to hold the latching bolts in their engaged position as illustrated. With this arrangement, it will be seen that upon actuation or energization of the solenoid 39 the latching bolts 32 and 33 will be withdrawn from engagement with the cover plate 26 and will remain disengaged until the solenoid is de-energized.

The base plate 21 also provides a mounting means for the GPS unit 41 and the comparator 42. The comparator 42 may be a programmable data processor such as a simple special purpose microprocessor which is coupled to the GPS system 41 to receive positional information signals and includes an input 43 for receiving and storing preset positional information representative of the geographic position of the intended destination of the cargo. The comparator 42 will have the capability when energized to compare the received positional information or real time coordinate signals from the GPS system 41 and to compare the signals with the preset positional information or set coordinate signals from the input 43 previously stored. Upon matching, or favorable comparison, of the stored preset coordinate signals with the GPS coordinate signals, the comparator will initiate a signal permitting energization of the latch control solenoid 39. This function is indicated schematically by the enabling switch 44 in FIG. 5. When the solenoid 39 is energized, the latch bolts 32 and 33 are withdrawn allowing the cover plate 26 to be moved in the right hand direction of FIG. 2, providing access to the lock 24.

The comparator 42 may be powered and its actuation triggered by any number of known means as for instance a battery equipped handset plugged into the comparator by the driver, operator or attendant. In other installations the powering and triggering of the comparator device may be accomplished by a key which connects the comparator circuit to the vehicle electrical system. Likewise, the solenoid 39 may be energized by the power source of the hand set or by the vehicle electrical system. The security system of the present invention thus prevents unlocking of the container until such time as the comparator is powered and triggered and the preset positional information matches the coordinate signals from the GPS unit. This can only occur upon the cargo unit arriving at the predetermined destination coordinates. It is possible and well within the skill of the art to provide an emergency override circuit accessible only by a particular code provided by a central control point, such as the originator of the cargo shipment.

The present invention has been described with reference to a preferred embodiment. Modification and alterations may become apparent to one skilled in the art upon reading and understanding this specification. It is intended to include all such modifications and alterations within the scope of the appended claims.

What is claimed is:

1. In a security system for a mobile unit, said mobile unit including enabling signal responsive security apparatus for actuation to perform a predetermined function only at a preset geographical location, the combination comprising;

a navigational system associated with said mobile unit for receiving geographic position information from an existing external navigational transmitter representative of the geographic position of said mobile unit, and programmable comparator means connected to said navigational system for receiving geographic position information therefrom and comparing said received information with stored preset geographic position information, said comparator including means to produce a security system enabling signal when said preset position information matches said received geographic position information in a predetermined manner.

2. The combination of claim 1, wherein said navigational system comprises a Global Positioning System for receiving and interpreting geographic position information from a plurality of satellites whose orbital paths are known.

3. The combination of claim 1, wherein said navigational system comprises a LORAN system for receiving and interpreting geographic position information from a plurality of transmitters whose geographic positions are known.

4. The combination of claim 1, wherein said security apparatus includes a latching mechanism for said mobile unit that may be activated to prevent access to a selected portion of said mobile unit and may be inactivated to allow access to said selected portion of said mobile unit, wherein receipt by said latching mechanism of said security system enabling signal from said comparator means inactivates said latching mechanism if said latching mechanism has been activated.

5. A security system for a mobile container comprising in combination;

a navigational system on said container for producing real time geographical position information signals, programmable data processing means for storing preset geographical position information signals, said data processing means being connected to receive real time geographical position signals from said navigational system and producing an enabling signal upon favorable comparison of the real time and preset signals, and locking means responsive to said enabling signal for permitting access to said container.

6. The combination of claim 5, wherein said navigational system comprises a Global Positioning System for receiving and interpreting geographic position information from a plurality of satellites whose orbital paths are known.

7. The combination of claim 5, wherein said navigational system comprises a LORAN system for receiving and interpreting geographic position information from a plurality of transmitters whose geographic positions are known.

8. A method for operating a security apparatus on a mobile unit comprising the steps of;

storing preset geographic position information on said mobile unit representing the geographic position of the desired destination for said unit, receiving geographic position information from an existing navigational system indicating the geographic position of said mobile unit, comparing the preset positional information with the received geographic position information and producing a security apparatus enabling signal when said preset position information matches said received geographic position information in a predetermined manner, and applying said enabling signal to control said security apparatus, whereby said security apparatus may be controlled only when the mobile unit arrives at said desired destination.

9. The method of claim 8 wherein said navigational system comprises a Global Positioning System for receiving and interpreting geographic position information from a plurality of satellites whose orbital paths are known.

10. The method of claim 8 wherein said navigational system comprises a LORAN system for receiving and interpreting geographic position information from a plurality of transmitters whose geographic positions are known.

11. The method of claim 8 wherein said security apparatus includes a latching mechanism for said mobile unit that may be activated to prevent access to a selected portion of said mobile unit and may be inactivated to allow access to said selected portion of said mobile unit, and including the step of;

applying said security apparatus enabling signal from said comparator means to said latching mechanism to inactivate said latching mechanism if said latching mechanism has been activated.

12. A method for securing access to a mobile container comprising the steps of;

producing real time geographic position information signals indicating the position of said container, storing preset geographic position information signals, comparing said real time signals with said preset signals to produce an enabling signal upon favorable comparison, and operating a locking mechanism responsive to said enabling signal for permitting access to said container.

13. The method of claim 12 wherein said real time geographic position information signal is produced by a Global Positioning System.

14. The method of claim 13 wherein said real time geographic position information signal is produced by a LORAN system.

15. In a security system for a mobile unit, said mobile unit including enabling signal responsive security apparatus for actuation to perform a predetermined function only at a preset geographical location, the combination comprising;

a navigational system associated with said mobile unit for producing real time geographical position information signals, and programmable data processing means for storing preset geographical position information signals, said data processing means being connected to receive real time geographical position signals from said navigational system and producing a security system enabling signal upon favorable comparison of the real time and preset signals.

16. A method for operating a security apparatus on a mobile unit comprising the steps of;

storing preset geographic position information signals, producing real time geographic position information signals indicating the position of said container, comparing said real time signals with said preset signals to produce a security apparatus enabling signal upon favorable comparison, and applying said enabling signal to control said security apparatus, whereby said security apparatus may be controlled only when the mobile unit arrives at a preset geographic destination.

* * * * *